United States Patent
Hsu et al.

(10) Patent No.: US 8,233,296 B2
(45) Date of Patent: Jul. 31, 2012

(54) FRONT-END CIRCUIT OF POWER CONVERTER

(75) Inventors: Yuan-Liang Hsu, Taipei (TW); Han-Yang Huang, Taipei (TW); Chih-Wei Hsiao, Taipei (TW)

(73) Assignee: Cyber Power System Inc., Taipei (TW)

( * ) Notice: Subject to any disclaimer, the term of this patent is extended or adjusted under 35 U.S.C. 154(b) by 528 days.

(21) Appl. No.: 12/583,769

(22) Filed: Aug. 26, 2009

(65) Prior Publication Data

US 2011/0051477 A1    Mar. 3, 2011

(51) Int. Cl.
*H02H 7/125* (2006.01)
*H02M 5/42* (2006.01)

(52) U.S. Cl. ............................................ 363/52; 363/89
(58) Field of Classification Search .............. 363/50–54, 363/84–89, 125–128; 361/42
See application file for complete search history.

(56) References Cited

U.S. PATENT DOCUMENTS

| | | | | |
|---|---|---|---|---|
| 5,363,047 A * | 11/1994 | Dresti et al. | ................... | 324/510 |
| 7,375,939 B2 * | 5/2008 | Weil | ................... | 361/45 |
| 7,505,291 B2 * | 3/2009 | Wang et al. | ................... | 363/89 |
| 7,535,739 B2 * | 5/2009 | Kidokoro et al. | ............... | 363/89 |
| 2002/0039026 A1 * | 4/2002 | Stroth et al. | .................. | 324/509 |

* cited by examiner

*Primary Examiner* — Jessica Han
(74) *Attorney, Agent, or Firm* — William E. Pelton, Esq.; Cooper & Dunham LLP

(57) ABSTRACT

A front-end circuit of a power converter has a power connection wiring detecting circuit, a power switch and a control unit. The power connection wiring detecting circuit is connected to an AC power. The control unit is connected to the power connection wiring detecting circuit. The power switch is connected to the power loop. The control unit turns on or off the AC power loop through the power switch. When the power connection wiring is correctly connected with the AC power, the control unit turns on the power switch and the front-end circuit outputs the AC power to the back-end circuit. When the power connection wiring is incorrectly connected with the AC power, the control unit turns off the power switch and the AC power is not outputted to the back-end circuit.

9 Claims, 1 Drawing Sheet

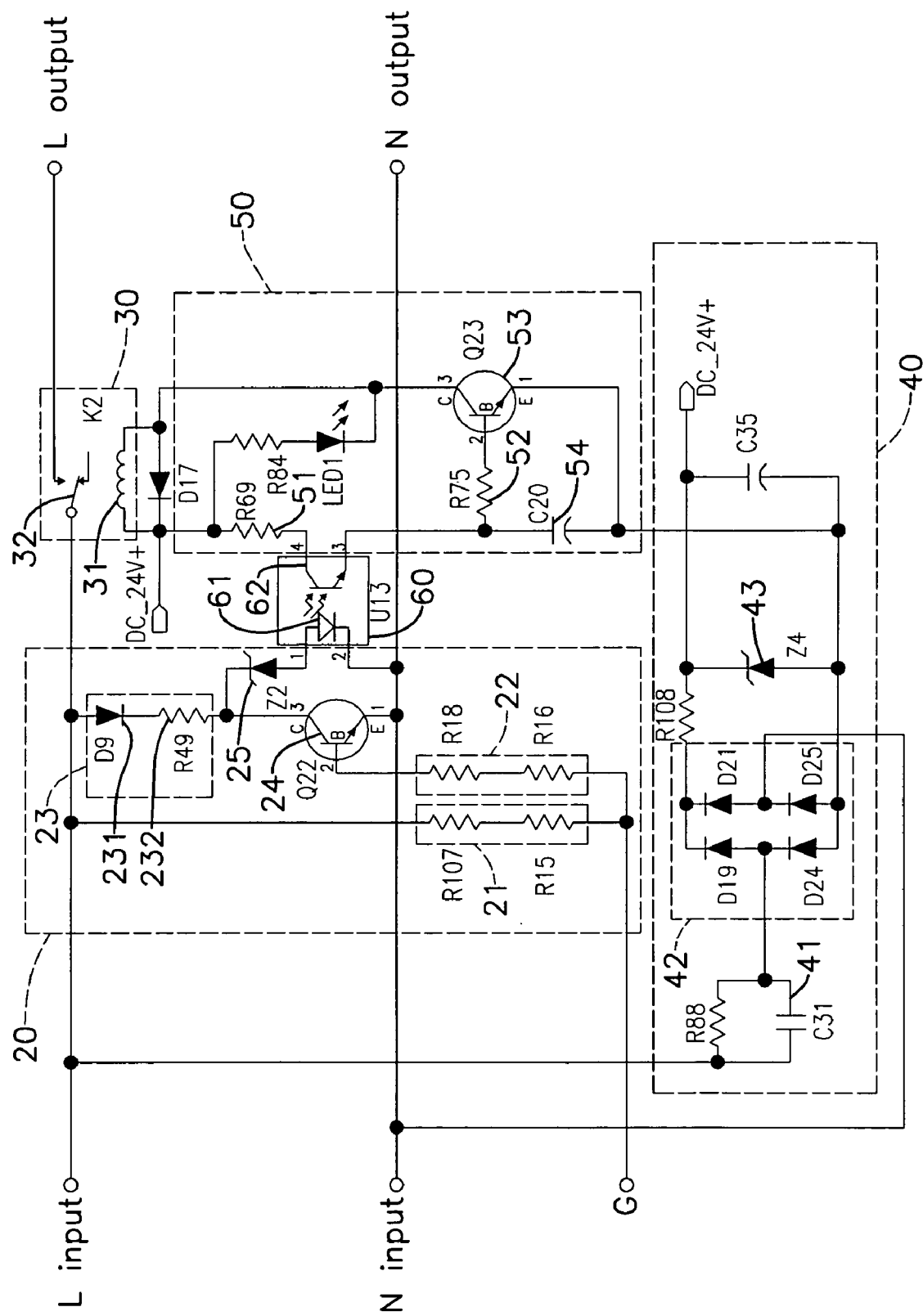

FRONT-END CIRCUIT OF POWER CONVERTER

BACKGROUND OF THE INVENTION

1. Field of the Invention

The present invention relates to a front-end circuit of power converter, and more particularly to a front-end circuit having a capability of detecting and determining an error power wiring.

2. Description of Related Art

Generally, a power converter is used to output a stable power to a load equipment. Such power converter contains a front-end circuit and a back-end circuit. The front-end circuit is connected to an AC power through the power wires and outputs the AC power to the back-end circuit. The AC power is converted to a stable power through the back-end circuit to supply to the load equipment. Whereas, if the power wires of the power converter are incorrectly connected with the AC power, e.g. reverse polarity caused between the power connection wiring and the AC power, power connection wiring having no ground or excessively large floating voltage when power connection wiring has no ground, and so forth, the front-end circuit of the power converter will result in noise, harmonic, surge or excessively large fluctuation of voltage and further leads to an unstable power outputted from the back-end circuit of the power converter. Meanwhile, such unstable output power will damage the load equipment in the next. As a result, if the power converter can possess a front-end circuit having a detecting function for power connection wiring to secure that the power converter is correctly connected with the AC power, the back-end circuit can then correctly output power to prevent the drawback concerning the unstable output power from the back-end circuit due to the incorrect connection of the power connection wiring and the AC power.

SUMMARY OF THE INVENTION

The main objective of the present invention is to provide an improved front-end circuit of a power converter, which ensures that the back-end circuit will output power only when the power connection wiring is correctly connected with AC power.

The front-end circuit of a power converter has a power connection wiring detecting circuit, a power switch and a control unit. The power connection wiring detecting circuit is connected to an AC power. The control unit is connected to the power connection wiring detecting circuit. The power switch is connected to the power loop in serial. The control unit turns on and off the AC power loop through the power switch. When the power connection wiring is correctly connected with the AC power, the control unit turns on the power switch and the front-end circuit outputs the AC power to a back-end circuit. When the power connection wiring is incorrectly connected with the AC power, the control unit turns off the power switch and the AC power is not outputted to the back-end circuit.

Other objectives, advantages and novel features of the invention will become more apparent from the following detailed description when taken in conjunction with the accompanying drawings.

BRIEF DESCRIPTION OF THE DRAWINGS

FIG. 1 is a detailed circuit diagram of a front-end circuit of a power converter in accordance with the present invention.

DETAILED DESCRIPTION OF THE PREFERRED EMBODIMENT

The technical solution addressed by the present invention to attain the objective planned for the present invention is further depicted by the preferred embodiments of the present invention along with the drawings in the following.

With reference to FIG. 1 a front-end circuit of power converter of a preferred embodiment in accordance with the present invention has a power connecting wiring detecting circuit (20), a power switch (30), an AC to DC conversion circuit (40), a control unit (50), and an isolation circuit (60).

The power connection wiring detecting circuit (20) has a first power connection terminal L, a second power connection terminal N and a ground terminal G. The first power connection terminal L and the second power connection terminal N are used to connect with L and N electrodes of an AC power, and the ground terminal G provides a grounding connection. The power connection wiring detecting circuit (20) detects if the first power connection terminal L, the second power connection terminal N and the ground terminal G are correctly connected with the AC power and the ground, and outputs the detection signal.

The power switch (30) is connected to the first power connection terminal L or the second power connection terminal N of the power connection wiring detecting circuit (20). The power switch (30) in the present embodiment is a relay and the relay further has a magnetic coil (31) and a toggle switch (32).

The AC to DC conversion circuit (40) is connected to the first and second power connection terminals to convert the AC power into a second DC power. The DC power is outputted to the magnetic coil (31) of the relay. The AC/DC conversion circuit (40) in the present embodiment has an input capacitor (41), a second rectification circuit (42) and a zener diode (43). The second rectification circuit (42) is a full-wave bridge rectifier. The output capacitor 41 is connected to the first power connection terminal L to acquire the AC power. The second rectification circuit (42) is connected between the output capacitor (41) and the second power connection terminal N to convert the AC power into a second DC power. The zener diode (43) is connected between output ends of the second rectification circuit (42) to steadily output the second DC power.

The control unit (50) is connected to the power switch (30) and the power connection wiring detecting circuit (20) through an isolation circuit (60) to acquire the detection signal of the power connection wiring detecting circuit (20). The control unit (50) turns on and off the power switch (30) according to the detecting signal.

The isolation circuit (60) is an optical coupler having a light-emitting diode (LED) (61) and a photo transistor (62). The LED (61) has a first end and a second end, and the photo transistor (62) has a first end and a second end.

The power connection wiring detecting circuit (20) has a bias resistor (21), a first rectification circuit (23), a voltage-stabilized diode (25), a first electronic switch (24) and a second current-limiting resistor (22).

The bias resistor (21) is connected between the first power connection terminal L and the ground terminal G. The bias resistor (21) is constituted by a plurality of resistors R107, R15.

The first rectification circuit (23) is connected to the first power connection terminal L to convert the AC power into a first DC power. The first rectification circuit (23) in the present embodiment has a forward-bias diode (231) and a third current-limiting resistor (232). The forward-bias diode (231) has an anode and a cathode, the anode is connected to the first power connection terminal L, and one end of the third current-limiting resistor (232) is connected to the cathode of the forward-bias diode (231).

The voltage-stabilized diode (25) is connected between the other end of the third current-limiting resistor (232) of the first rectification circuit (23) and the first end of the LED (61) of the isolation circuit (60).

The first electronic switch (24) is serially connected between the first power connection terminal L and the second power connection terminal N through the first rectification circuit (23) and connected in parallel with the first end and the second end of the LED (61) of the isolation circuit (60) through the voltage-stabilized diode (25). The on and off states of the first electronic switch (24) are controlled if the LED (61) of the optical coupler (60) will turn on to reply the status concerning whether the first and second connection terminals and the ground terminal G are correctly connected to the control unit (50). The first electronic switch (24) in the present embodiment is a NPN transistor. The NPN transistor has an emitter, a base and a collector. The emitter is connected with the second power connection terminal N, and the collector is connected with the third current-limiting resistor (232) of the first rectification circuit (23).

The second current-limiting resistor (22) is connected between the base of the first electronic switch (24) and the ground terminal G to turn on or off the first electronic switch (24), and the second current-limiting resistor (22) is constituted by a plurality of resistors R18, R16.

The control unit (50) has a forth current-limiting resistor (51), a second electronic switch (53), fifth current-limiting resistor (52) and charging capacitor (54).

The fourth current-limiting resistor (51) is connected between the AC to DC conversion circuit (40) and the photo transistor (62) of the isolation circuit (60).

The second electronic switch (53) is connected to the power switch (30) and the AC to DC conversion circuit (40) to establish a second DC power loop. The second electronic switch (53) is connected in serial at the DC power loop, so as to turn on or off the second DC power loop. The second electronic switch (53) in the present embodiment is an NPN transistor, the NPN transistor has an emitter, a base and a collector, and the collector. The collector of the second electronic switch (53) is connected to the magnetic coil (31) of the power switch (30).

The fifth current-limiting resistor (52) is connected between the base of the second electronic switch (53) and the photo transistor (62) of the isolation circuit (60).

The charging capacitor (54) is serially connected with the photo transistor (62) of the optical coupler and connected to the control end of the second electronic switch (53) through the fifth current-limiting resistor (52) to turn on or off the second electronic switch (53).

Mostly because of the transient conducting characteristic of the input capacitor (41), the AC to DC conversion circuit (40) does not allow four diodes D19, D25, D31 and D24 of the second rectification circuit (42) to be on constantly so as to constitute a non-consumption type capacitor step-down circuit to supply the stable second DC power to the magnetic coil (31) of the relay.

When the power wires of the power converter connection wiring detecting circuit (20) are correctly connected with the corresponding electrodes of the AC power, there is no potential difference between the second power connection terminal N and the ground terminal G of the power connection wiring detecting circuit (20). Therefore, no forward-bias voltage is provided to the base and the emitter of the first electronic switch (24), the first electronic switch (24) turns off. Consequently, the AC power will be rectified to a first DC power through the first rectification circuit (23) to further turn on the voltage-stabilized diode (25) and drive the LED (61) of the isolation circuit (60). Furthermore, when the LED (61) of the isolation circuit (60) is driven, the LED (61) will emit to turn on the photo transistor (62) of the isolation circuit (60). Hence, the second DC power is supplied to the charging capacitor (54) through the photo transistor (62) and the fourth current-limiting resistor (51) of the control unit (50). When the charging capacitor (54) is charged until voltage of the charging capacitor (51) is larger than the forward-bias voltage between the base and emitter of the second electronic switch (53), the second electronic switch (53) is conducted. At the time, the second DC loop is established and the second DC power is supplied to the power switch (30). In the meantime, as the power switch (30) and the second electronic switch (53), are serially connected with the second DC power, the second DC power, the power switch (30) and the second electronic switch (53) establish the DC power loop when the second electronic switch (53) turns on. The second DC power is inputted to the magnetic coil (31) of the power switch (30) to turn on the power switch (30). Therefore, the AC power can be outputted to the back-end circuit of power converter from which a power is further outputted.

Described above is the detailed operational theory of circuit when the power connection wiring of the power connection wiring detecting circuit and the AC power are correctly connected. The operational theory of circuit when the power connection wiring of the power connection wiring detecting circuit and the AC power are incorrectly connected is described in details as follows:

When the polarities of the first power connection terminal L and the second power connection terminal N of the power connection wiring detecting circuit (20) are reverse, the first electronic switch (24) turns on as a voltage difference dropped between the second power connection terminal N and the ground terminal G. After the AC power is rectified to the first DC power through the first rectification circuit (23), most current of the first DC power flow through the first electronic switch (24) to the second power connection terminal N. Therefore, the voltage-stabilized diode (25) is not conductive and the isolation circuit (60) is not operated. That is, the second DC power is not supplied to charge the charging capacitor (54) through the photo transistor (62) of the isolation circuit (60) to charge the charging capacitor (54). Therefore, the second electronic switch (53) turns off. As such, the second DC power, the power switch (30) and the second electronic switch (53) does not establish a DC power loop. The second DC power is not supplied to the magnetic coil (31) of the power switch (30) to further control the toggle switch (32) of the power switch (30) to cut off the AC power loop. In other words, the AC power is not outputted to the back-end circuit of power converter and thus no power will be outputted.

When the ground terminal G of the power connection wiring detecting circuit (20) is not grounded, the first electronic switch (24) turns on because the first power connection terminal L is connected to the ground terminal G through the bias resistor (21) and the bias voltage is provided to the ground terminal G. After the AC power is rectified to the first DC power through the first rectification circuit (23), most current of the first DC power flow through the first electronic switch (24) to the second power connection terminal N. Therefore, the voltage-stabilized diode (25) is not conductive, and the isolation circuit (60) is not operated as well. The second DC power is not supplied to charge the charging capacitor (54) through the photo transistor (62) of the isolation circuit (60). The second electronic switch (53) turn off. As such, the second DC power, the power switch (30) and the second electronic switch (53) do not establish the DC power loop. The second DC power is not supplied to the magnetic coil (31) of the power switch (30) to further control the toggle switch (32) of the power switch (30) to cut off the AC power loop. In other words, the AC power won't be able to be outputted to the back-end circuit of power converter, and thus no power will be further outputted.

When the ground terminal G of the power connection wiring detecting circuit is not grounded and the floating voltage is excessively large, the excessively large floating voltage in the present embodiment with a range that the floating voltage exceeds 30V turns the first electronic switch (24) on. After the AC power is rectified to the first DC power through the first rectification circuit (23), most current of the first DC power (24) flow through the first electronic switch (24) to the second power connection terminal N. Therefore, the first DC power is not supplied to the voltage-stabilized diode (25), and the isolation circuit (60) is not operated. The second DC power is not supplied to charge the charging capacitor (54) through the photo transistor (62) of the isolation circuit (60). The second electronic switch (53) turns off. As such, the second DC power, the power switch (30) and the second electronic switch (53) do not establish the DC power loop. The second DC power is not supplied to the magnetic coil (31) of the power switch (30) to further control the toggle switch (32) of the power switch (30) to cut off the AC power loop. In other words, the AC power won't be able to be outputted to the back-end circuit of the power converter, and no power will be outputted as well.

The control unit will obtain the detection signal from the power connection wiring detecting circuit to control the power switch and turn on the AC power loop when the power connection wiring of the power connection wiring detecting circuit and the AC power are correctly connected. As such, the AC power can be outputted to the back-end circuit from which a power is further outputted. However, the control unit will obtain the detection signal from the power connection wiring detecting circuit to control the power switch and turn off the AC power loop when the power connection wiring of the power connection wiring detecting circuit and the AC power are incorrectly connected. In that case, the AC power won't be able to be outputted to the back-end circuit and no power will be further outputted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A front-end circuit of power converter, comprising:
   a power connection wiring detecting circuit having a first power connection terminal, a second power connection terminal and a ground terminal, wherein the first power connection terminal and the second power connection terminal are connected with an AC power, the ground terminal is connected to the ground and the power connection wiring detecting circuit detects if the first power connection terminal, the second power connection terminal and the ground terminal are correctly connected with the AC power and the ground and then outputs a detection signal;
   a power switch connected to the first power connection terminal or the second power connection terminal of the power connection wiring detecting circuit;
   an AC to DC conversion circuit converting the AC power to a second DC power and then steadily outputting the second DC power to the power switch; and
   a control unit connected with the power switch and the power connection wiring detecting circuit through an isolation circuit to acquire the detection signal from the power connection wiring detecting circuit to turn on or off the power switch.

2. The front-end circuit of power converter as claim in claim 1, wherein
   the isolation circuit is an optical coupler, the optical coupler comprises:
      an LED comprising a first end and a second end;
      a photo transistor comprising a first end and a second end; and
   the power connection wiring detecting circuit comprises:
      a bias resistor connected between the first power connection terminal and the ground terminal;
      a first rectification circuit connected to the first power connection terminal to convert the AC power into a first DC power;
      a voltage-stabilized diode connected between the first rectification circuit and the first end of the LED of the isolation circuit;
      a first electronic switch serially connected between the first power connection terminal and the second power connection terminal through the first rectification circuit, and connected in parallel with the first end and the second end of the LED of the isolation circuit through the voltage-stabilized diode to control on and off states of the LED of the optical coupler by turning on or off the first electronic switch; and
      a second current-limiting resistor connected between a control end and a ground end of the first electronic switch to turn on and off the first electronic switch.

3. The front-end circuit of power converter as claim in claim 2, wherein the control unit comprises:
   a fourth current-limiting resistor connected between the AC to DC conversion circuit and the first end of the photo transistor of the isolation circuit;
   a second electronic switch serially connected to a second DC power loop to turn on and off the second DC power loop;
   a fifth current-limiting resistor connected between the control end of the second electronic switch and the second end of the photo transistor or the isolation circuit; and
   a charging capacitor serially connected with the photo transistor of the optical coupler and connected to the control end of the second electronic switch through the fifth current-limiting resistor to turn on and off the second electronic switch.

4. The front-end circuit of power converter as claim in claim 3, wherein the AC to DC conversion circuit further comprises:
   an input capacitor connected to the first power connection terminal to acquire the AC power;
   a second rectification circuit connected between the input capacitor and the second power connection terminal to convert the AC power into the second DC power; and a zener diode connected between the output ends of the second rectification circuit to steadily output the second DC power.

5. The front-end circuit of power converter as claim in claim 4, wherein the second rectification circuit is a full-wave bridge rectifier.

6. The front-end circuit of power converter as claim in claim 5, wherein the first rectification circuit further comprises:
   a forward-bias diode comprising a cathode and an anode connected to the first power connection terminal; and
   a third current-limiting resistor connected between the cathode of the forward-bias diode and the voltage-stabilized diode.

7. The front-end circuit of power converter as claim in claim 6, wherein the first electronic switch is an NPN transistor, the NPN transistor comprises:
   a base connected to the ground through the second current-limiting resistor;
   an emitter connected to the second power connection terminal; and
   a collector connected to the third current-limiting resistor of the first rectification circuit.

8. The front-end circuit of power converter as claim in claim 7, wherein the second electronic switch is an NPN transistor and the NPN transistor comprises an emitter, a base and a collectors wherein
   the base and the emitter of the second electronic switch are connected in parallel with the charging capacitor through the fifth current-limiting resistor; and
   the collector of the second electronic switch is connected to the power switch.

9. The front-end circuit of power converter as claim in claim 8, wherein the power switch is a relay, the relay comprises:
   a magnetic coil connected between the second DC power and the collector of the second electronic switch; and
   a toggle switch connected to the first power connection terminal or the second power connection terminal of the power connection wiring detecting circuit.

* * * * *